(12) United States Patent
Keck

(10) Patent No.: US 9,545,150 B2
(45) Date of Patent: Jan. 17, 2017

(54) STORAGE RACK ASSEMBLY WITH DUAL-RAIL TRUSS-BEAM

(71) Applicant: Steel King Industries, Inc., Stevens Point, WI (US)

(72) Inventor: Arlin Dennis Keck, Plover, WI (US)

(73) Assignee: Steel King Industries, Inc., Stevens Point, WI (US)

( * ) Notice: Subject to any disclaimer, the term of this patent is extended or adjusted under 35 U.S.C. 154(b) by 267 days.

(21) Appl. No.: 14/052,379

(22) Filed: Oct. 11, 2013

(65) Prior Publication Data

US 2015/0101998 A1 Apr. 16, 2015

(51) Int. Cl.
*A47B 47/02* (2006.01)
*B65G 1/02* (2006.01)

(52) U.S. Cl.
CPC .............. *A47B 47/028* (2013.01); *B65G 1/02* (2013.01)

(58) Field of Classification Search
CPC ................................ A47B 47/028; B65G 1/02
USPC .................................................. 211/191, 192
See application file for complete search history.

(56) References Cited

U.S. PATENT DOCUMENTS

| | | | | |
|---|---|---|---|---|
| 2,327,587 A | * | 8/1943 | Attwood | B65G 1/02 211/182 |
| 2,894,641 A | * | 7/1959 | Edwards, Jr. | A47B 47/022 211/134 |
| 2,968,409 A | * | 1/1961 | Jurechko | B65G 1/14 211/134 |
| 3,127,995 A | * | 4/1964 | Mosinski | A47B 57/402 211/182 |
| 3,144,944 A | * | 8/1964 | McConnell | A47B 57/487 211/192 |
| 3,323,655 A | * | 6/1967 | Foran | A47B 57/402 211/134 |
| 3,337,061 A | * | 8/1967 | Caudell | B65G 1/02 211/134 |
| 3,365,073 A | * | 1/1968 | Degener | A47B 57/26 211/182 |
| 3,391,795 A | * | 7/1968 | Finlayson | A47B 57/50 211/134 |
| 3,561,608 A | * | 2/1971 | Weider | B65G 1/02 211/183 |
| 3,695,456 A | * | 10/1972 | Lewis | A47B 57/402 211/191 |
| 3,785,502 A | * | 1/1974 | Konstant | B65G 1/02 108/108 |
| 3,971,476 A | * | 7/1976 | Konstant | A47F 5/10 211/134 |
| 4,117,938 A | * | 10/1978 | Klein | A47B 57/482 211/182 |
| 4,319,689 A | | 3/1982 | Clapp | |
| 5,273,170 A | | 12/1993 | Azzopardi | |
| 5,316,428 A | * | 5/1994 | Charping | B65G 1/02 211/134 |

(Continued)

FOREIGN PATENT DOCUMENTS

DE 897379 C * 11/1953 ............. A47B 55/00

*Primary Examiner* — Stanton L Krycinski
(74) *Attorney, Agent, or Firm* — Merchant & Gould P.C.

(57) ABSTRACT

A double-wide, drive in storage rack assembly for supporting loads on pallets including horizontal truss beams and stiffener panels at load-supporting levels constructed to increase the rigidity of the rack and/or minimize the amount of steel used in the rack. In some examples, the storage rack assembly includes mill-building bracing.

2 Claims, 17 Drawing Sheets

(56) References Cited

U.S. PATENT DOCUMENTS

| | | | | |
|---|---|---|---|---|
| 6,216,893 B1* | 4/2001 | Lee | ............ | B65G 1/02 |
| | | | | 211/182 |
| 6,260,719 B1* | 7/2001 | Azzopardi | ............ | B65G 1/02 |
| | | | | 211/189 |
| 8,727,144 B2* | 5/2014 | Krummell | ............ | B65G 1/02 |
| | | | | 211/191 |
| 2010/0054906 A1* | 3/2010 | Hartman | ............ | B65G 1/02 |
| | | | | 414/807 |
| 2011/0139733 A1* | 6/2011 | Hartman | ............ | B65G 1/02 |
| | | | | 211/13.1 |
| 2012/0145657 A1* | 6/2012 | Krummell | ............ | B65G 1/02 |
| | | | | 211/49.1 |

* cited by examiner

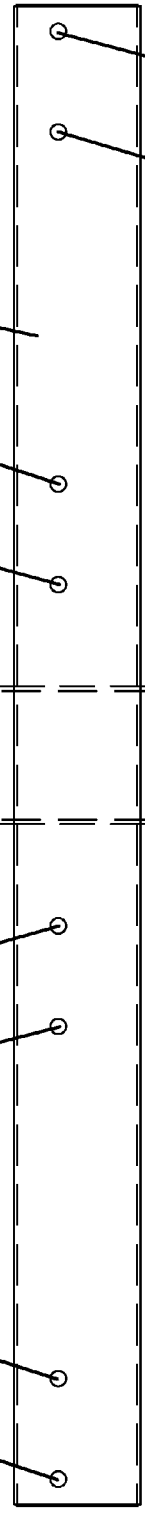
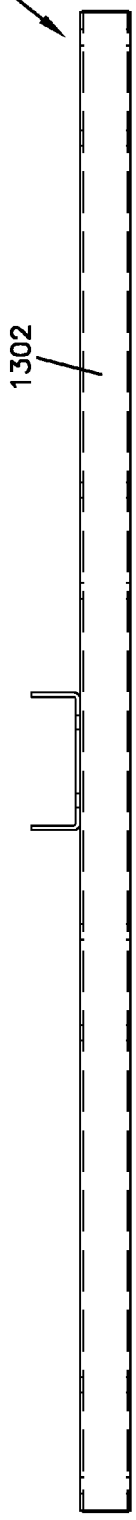

STORAGE RACK ASSEMBLY WITH DUAL-RAIL TRUSS-BEAM

BACKGROUND

Storage rack assemblies are used to store multiple palletized loads, containing, for example, goods in a space efficient manner. Storage rack assemblies are commonplace in warehouses and some types of consumer stores (e.g., home improvement stores, membership wholesale club stores, etc.). The palletized loads are typically placed in the storage rack assembly using pallet loading equipment, such as a forklift, crane, or powered shuttle cart.

In a storage rack assembly, palletized loads are stored in one or more adjacent lanes or bays. At least one end of each lane is open so that the pallet loading equipment may enter into the assembly to place the palletized loads in the storage rack assembly. The first palletized load will be placed at the far end of the lane. Subsequent palletized loads will be placed adjacent to the already placed palletized loads. In this manner, the lane will be filled from far end to open end. Palletized loads may be stored on one or more elevated levels, as well as a floor level.

Because the palletized loads may be heavy, the assembly must be constructed to remain rigid even while supporting heavy loads. Often, such storage rack assemblies are constructed using large quantities of steel or similar strong, rigid materials. Such quantities may be expensive and may raise the cost of the storage rack assembly, however.

SUMMARY

In a first aspect a first example rack assembly is disclosed. The first example assembly includes a first side and a second side. The first and second sides are parallel to each other. Each of the first and second sides comprises a plurality of vertically disposed posts. The first example assembly additionally includes a first truss beam and a second truss beam. The first and second truss beams are oriented horizontally and are parallel to and coplanar with each other. The first truss beam is secured to the vertical posts of the first side and the second truss beam is secured to the vertical posts of the second side. The first example assembly additionally includes a stiffener panel. The stiffener panel is oriented horizontally and is coplanar with and perpendicular to the side truss beams. The stiffener panel is secured to the first truss beam and the second truss beam.

In a second aspect a second example rack assembly is disclosed. The second example assembly includes a front end and a rear end. The second example assembly also includes a plurality of support assemblies extending from the front end to the rear end. Each of the support assemblies includes a plurality of vertically disposed and parallel support structures. Additionally, the second example assembly includes a plurality of horizontally disposed and coplanar truss beams. The truss beams extend from the front end to the rear end. The truss beams being positioned vertically at one or more load-supporting levels. The truss beams being secured to the support structures in a support assembly. The second example assembly also includes a plurality of horizontally disposed stiffener panels disposed perpendicular to the support assemblies. One of the stiffener panels being positioned between each pair of adjacent support assemblies at each load-supporting level, and the stiffener panels being secured to one or more truss beams. Each truss beam is secured to each of the support structures in one of the support assemblies.

In a third aspect, an example storage rack, arranged in lanes for supporting loads on pallets, is disclosed. The example storage rack includes a first plurality of individual support structures spaced apart in the down-lane direction and extending laterally between a rear end of the rack and a front end of the rack. The columns being positioned along a first side of the rack. Additionally, the example storage rack includes a second plurality of support structures spaced apart in the down-lane direction and extending laterally between a rear end of the rack and a front end of the rack. The second plurality of support structures being positioned laterally in the cross lane direction from the first plurality of support structures along a second side of the rack. The example storage rack also includes a plurality of support arms on each of the support structures. The support arms being spaced apart vertically on the columns to extend horizontally out from the columns in the cross-lane direction at a plurality of load-supporting levels. The support arms on each column being located in horizontal alignment with support arms on adjacent columns down-lane and cross-lane to provide load support at the levels. The support arms being secured to the columns. Additionally, the example storage rack includes a plurality of pairs of truss beams extending laterally in the down-lane direction between the rear end of the rack and the front end of the rack at each load-supporting level. Each of the truss beams includes a first rail and a second rail. The first rail and the second rail being spaced apart horizontally in the cross-lane direction. Each truss beam including a plurality of horizontal support braces extending perpendicularly from the first rail to the second rail and a plurality of horizontal support braces extending diagonally from the first rail to the second rail. Each truss beam being secured to one or more of the support arms. The example storage rack also includes a plurality of stiffener truss beams. Each stiffener truss beam extending laterally in the cross-lane direction at each load-supporting level. Each stiffener truss beam being positioned at the rear end of the rack. Each stiffener truss beam comprising a first rail and a second rail. The first rail and the second rail being space apart horizontally in the down-lane direction. Each stiffener truss beam including a plurality of horizontal support braces extending perpendicularly from the first rail to the second rail and a plurality of horizontal support braces extending diagonally from the first rail to the second rail. Each pair of truss beam being secured to one of the stiffener truss beams.

DESCRIPTION OF THE DRAWINGS

Aspects of the disclosure may be more completely understood in consideration of the following detailed description of various embodiments of the disclosure in connection with the accompanying drawings, wherein:

FIG. 13 is front view of an example double-sided support arm of the double-wide drive-in storage rack assembly of FIG. 1.

FIG. 14 is a top view of the double-sided support arm of FIG. 13.

DETAILED DESCRIPTION

The example embodiments described in the following disclosure are provided by way of illustration only and should not be construed as limiting. Various modifications and changes may be made to the example embodiments described below without departing from the true spirit and scope of the disclosure.

The present disclosure relates generally to a drive-in storage rack. More specifically, the present disclosure relates to a double-wide drive-in storage rack with dual-rail truss-beams.

In the following example embodiments, the double-wide drive-in storage rack is constructed with dual-rail truss-beams to accomplish one or more of the following: a) increase the rigidity of the storage rack; and/or b) minimize the amount of steel used in the storage rack. Although the present disclosure is not so limited, an appreciation of the various aspects of the disclosure will be gained through a discussion of the examples provided below.

Figure 1:
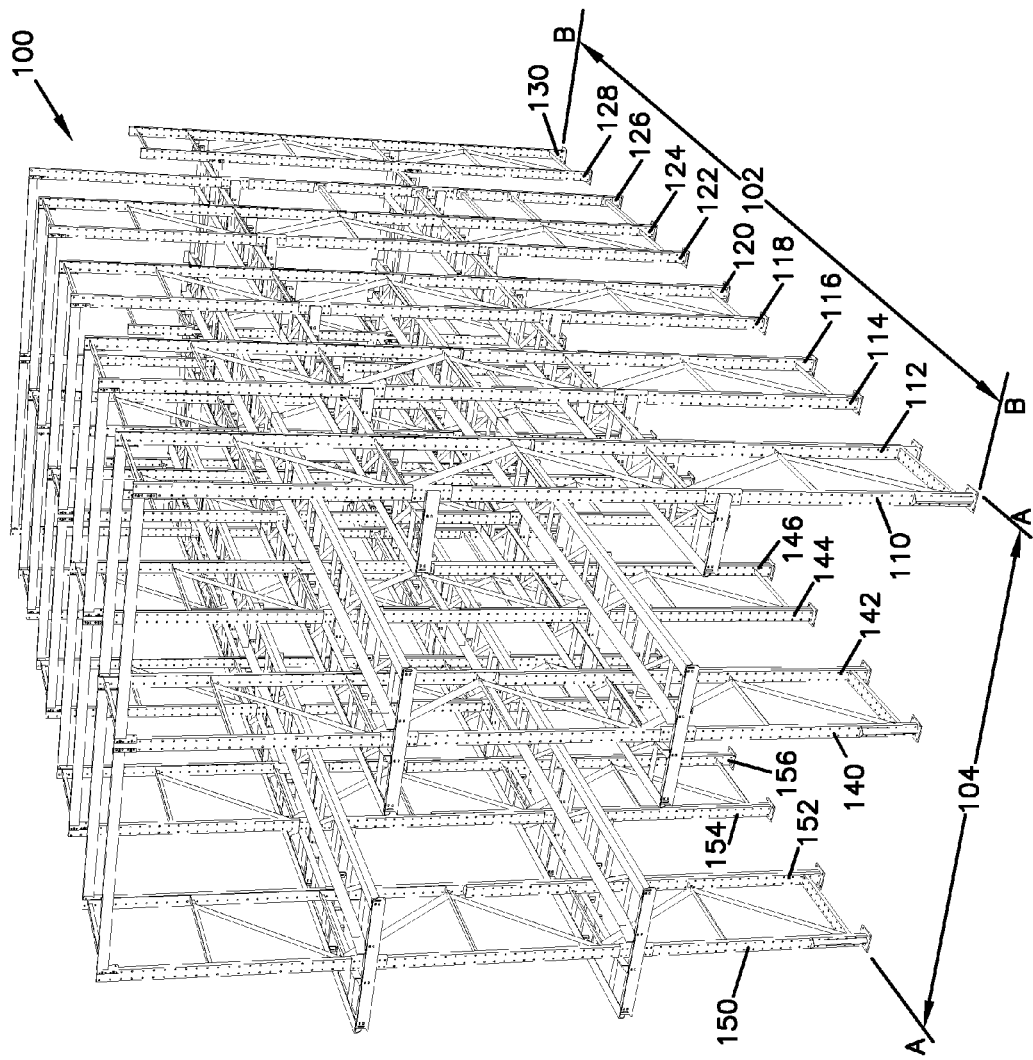
FIG. 1 is a perspective view of an example double-wide drive-in storage rack assembly.

Referring now to FIG. 1, a perspective view of an example double-wide drive-in storage rack assembly 100 is shown. The storage rack 100 is oriented along a down-lane direction 102 and a cross-lane direction 104. The cross-lane direction 104 is perpendicular to the down-lane direction 102.

The storage rack includes multiple support assemblies. In some embodiments, a support assembly is formed from a plurality of linearly aligned support structures. For example, support structures 110, 112, 114, 116, 118, 120, 122, 124, 126, 128, and 130 form a first support assembly. Similarly, support structures 140, 142, 144, 146, and seven unlabeled support structures form a second support assembly. And support structures 150, 152, 154, 156, and seven unlabeled support structures form a third plurality of linearly aligned support structures. Although storage rack 100 includes eleven support structures in each support assembly, some embodiments of storage rack 100 include support assemblies formed from more or fewer support structures.

Each pair of adjacent support assemblies forms a lane or bay within which palletized loads may be stored. For example, a first lane is formed between the first and second support assemblies, and a second lane is formed between the second and third support assemblies. Although the embodiment of storage rack 100 shown in FIG. 1 includes two lanes, a storage rack may include more or fewer lanes. In fact, the embodiment of storage rack 100 shown in FIG. 1 is truncated from a larger storage rack assembly.

One of the support structures in each support assembly is adjacent to the front of the storage rack. For example, support structures 110, 140, and 150 are adjacent to the front of the storage rack. Similarly, one of the support structures in each support assembly is adjacent to the rear of the storage rack. For example, support structure 130 is adjacent to the rear of the storage rack.

In some embodiments, the support structures are formed from a single vertically disposed post. In other embodiments, the support structures are formed from an upright frame assembly comprising multiple vertically disposed posts that are welded or bolted together. Yet other embodiments of the support structures are possible as well. The support structures may be formed from steel or other materials. In some embodiments, the support structures are secured to the floor or any other flat, stable surface. The support structures may be secured using screws, bolts, other fasteners, or any other means.

Figure 2:
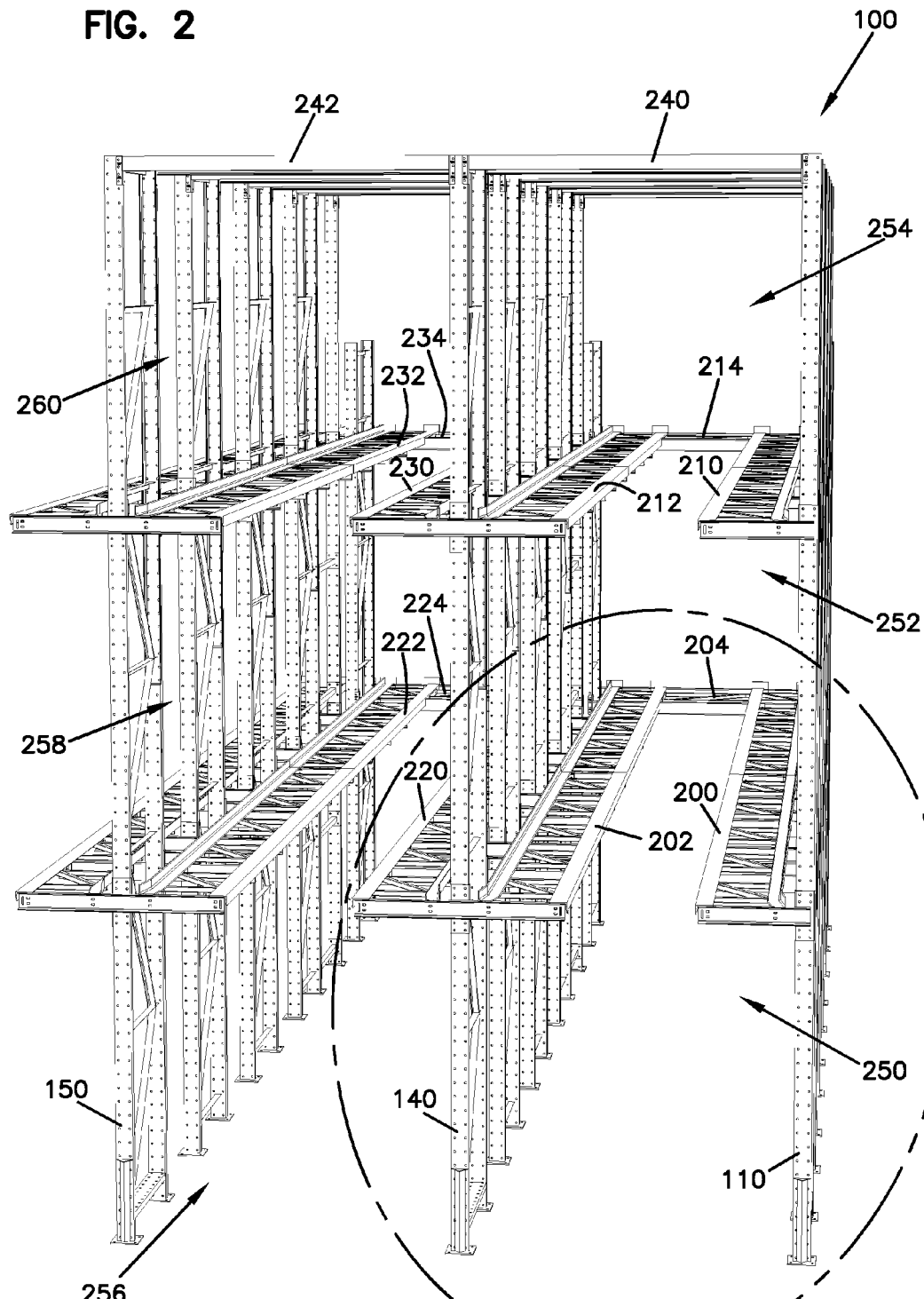
FIG. 2 is a down-lane perspective view of the double-wide drive-in storage rack assembly of FIG. 1.
Figure 3:
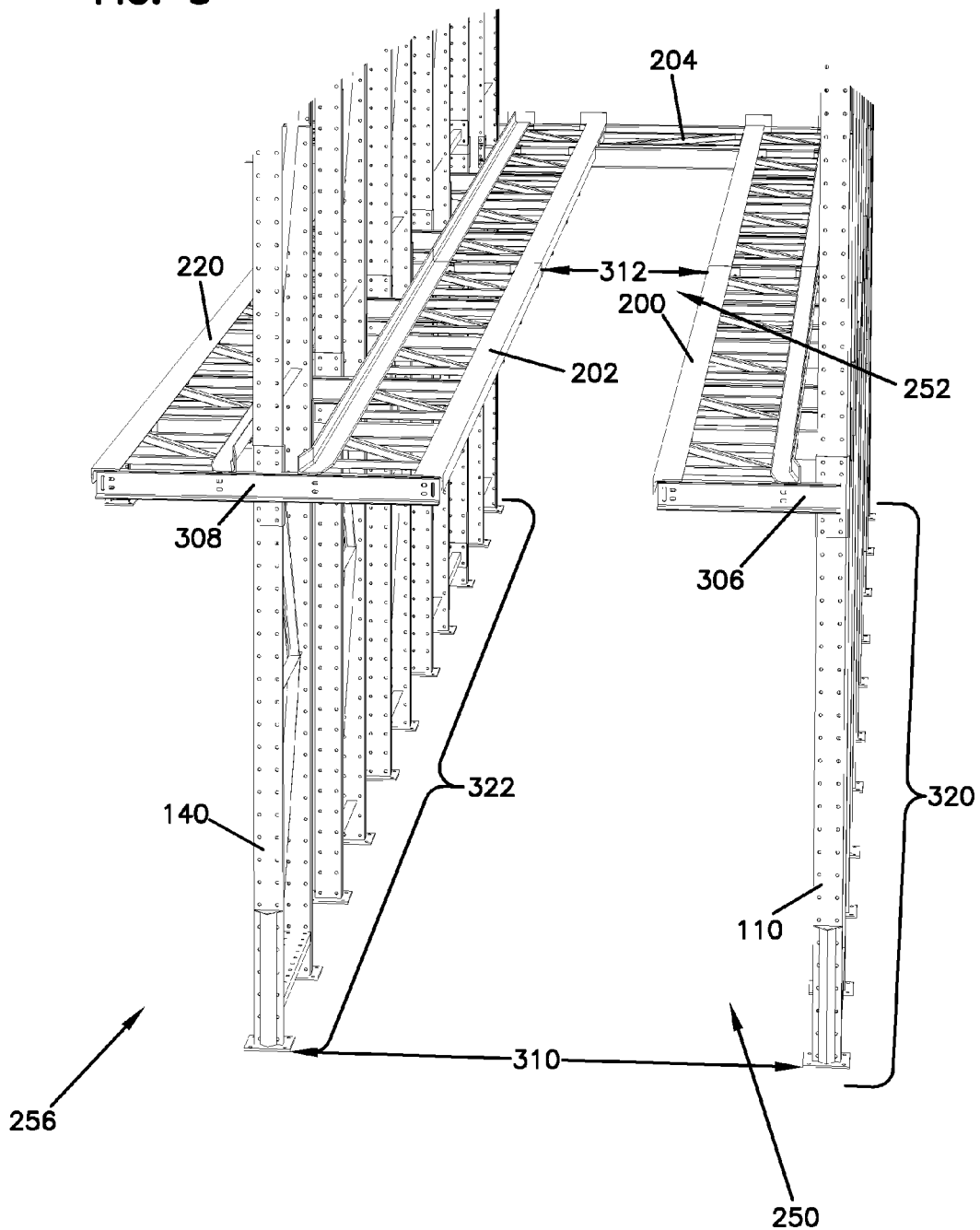
FIG. 3 is a down-lane perspective view of a single storage location of the double-wide drive-in storage rack assembly of FIG. 1.

Referring now to FIGS. 2 and 3, a down-lane perspective view of storage rack 100 is shown. FIG. 3 primarily shows a single storage location 250 of storage rack 100. Each lane is divided into multiple vertical storage locations by pairs of truss beams that form load-supporting levels. The first lane is divided into three storage locations 250, 252, and 254. Similarly, the second lane is also divided into three storage locations 256, 258, and 260.

In the first lane, truss beams 200 and 202 are part of a first load-supporting level, separating storage location 250 from storage location 252, and truss beams 210 and 212 are part of second load-supporting level, separating storage location 252 from storage location 254. Similarly, in the second lane, truss beams 220 and 222 are part of a first load-supporting level, separating storage location 256 from storage location 258, and truss beams 230 and 232 are part of a second load-supporting level, separating storage location 258 from storage location 260. In some embodiments, each load-supporting level includes one or more stiffener panels adjacent to the rear of the storage rack. For example, storage rack 100 includes stiffener panels 204, 214, 224, and 234. Although the embodiment of storage rack 100 shown includes two load-supporting levels, other embodiments of storage rack 100 include more or fewer load-supporting levels. Similarly, a storage rack may also be configured with more or fewer storage locations than the illustrated embodiment. Palletized loads may be stored on the load-supporting levels. In addition, palletized loads may be stored on the floor below the first load-supporting level.

Pairs of corresponding support structures in adjacent support assemblies may be connected by top braces. For example, support structures 110 and 140 are connected by top brace 240 and support structures 140 and 150 are connected by top brace 242.

The sides of a storage location are defined by the support assemblies. For example, the sides of storage location 250 are defined by a first support assembly 320, including support structure 110, and a second support assembly 322, including support structure 140. Each support structure in the first support assembly is separated from the corresponding support structure in the second support assembly by a distance 310 in the cross-lane direction. Distance 310 is greater than twice the width of a pallet. Accordingly, two palletized loads may be placed side-by-side in a storage location. In some embodiments, distance 310 is eight feet. Other embodiments with a distance 310 of between four feet and twelve feet are possible as well. Yet other embodiments with a shorter or longer distance 310 are possible as well.

The top of the storage location 250 is defined by truss beams 200, 202 and stiffener panel 204, which together form a load-supporting level. This load-supporting level also defines the bottom of storage location 252. Truss beams 200 and 202 are separated by a distance 312 in the cross-lane direction. Distance 312 is greater than the width of all or a portion of the pallet loading equipment. In some embodiments, distance 312 is greater than the width of the mast portion of a forklift. In other embodiments, distance 312 is greater than width of the mast, body, and overhead guard of a forklift. Accordingly, the pallet loading equipment may enter the front of storage location 250 and move in the down-lane direction towards to the rear of the storage rack while elevating the palletized load above truss beams 200 and 202 without contacting truss beams 200 and 202. In some embodiments, distance 312 is four feet. Other embodiments with a distance 312 of between one foot and seven feet are possible as well. Yet other embodiments with a shorter or longer distance 312 are possible as well.

In this manner, the pallet loading equipment may be used to place palletized loads into storage location 252 by lifting a pair of side-by-side palletized loads up and above truss beams 200 and 202 and then moving the pallet loading equipment in the down-lane direction with the pallet loading equipment fitting between truss beams 200 and 202. When the palletized loads are in position, the palletized loads are lowered so that the bottom of the palletized loads rest on truss beams 200 and 202.

Truss beam 200 is secured to support structure 110 with single-sided support arm 306. Truss beam 202 is secured to support structure 140 with double-sided support arm 308. Support arm 308 also secures support structure 140 to truss beam 220, which defines the top of storage location 256. As shown in and discussed with respect to FIG. 4, truss beams are also secured to many of the other support structures with single- or double-sided support arms as well.

Figure 4:
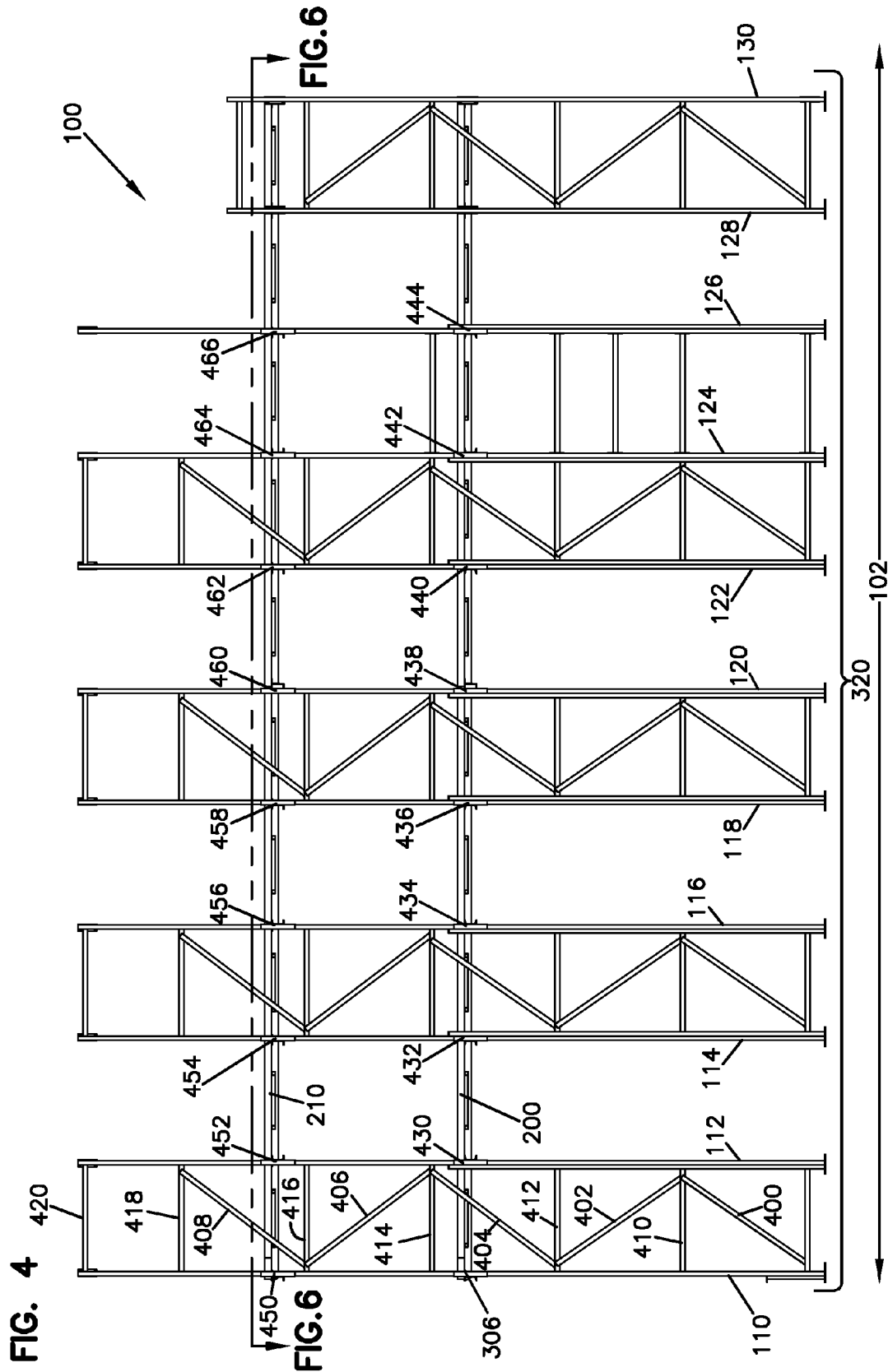
FIG. 4 is a side view of the double-wide drive-in storage rack assembly of FIG. 1.

Referring now to FIG. 4, a side view of storage rack 100 is shown. In some embodiments, adjacent support structures are connected with one or more diagonally disposed support braces and one or more horizontally disposed support braces. For example, support structures 110 and 112 are connected by diagonally disposed support braces 400, 402, 404, 406, 408 and horizontally disposed support braces 410, 412, 414, 416, 418, and 420. Adjacent pairs of support structures 114 and 116; 118 and 120; 122 and 124; and 128 and 130 are also connected to each other by diagonally and horizontally disposed support braces. In the illustrated embodiment, the support braces provide additional rigidity for the support structures. In some embodiments, adjacent support structures are not connected by support braces.

Truss beams 200 and 210 are disposed in the down-lane direction at a first and second load-supporting level, respectively. Truss beam 200 is secured to the support structures of first support assembly 320 by single-sided support arms 306, 430, 432, 434, 436, 438, 440, 442, and 444. Similarly, truss beam 210 is secured to the support structures of first support assembly 320 by single-sided support arms 450, 452, 454, 456, 458, 460, 462, 464, and 466. In the embodiment of storage rack 100 shown in FIG. 4, some of the truss beams are secured to interior support assemblies with double-sided support arms.

In some embodiments, the two rearmost support structures in each support assembly are not as tall as the other support structures. For example, support structures 128 and 130 are not as tall as the other support structures of first support assembly 320. Due to support structures 128 and 130 proximity to the stiffener panels in the rear of the storage racks, support structures 128 and 130 may not need the additional stiffness provided by a top brace. Consequently, support structures 128 and 130 are shorter, lighter, and less expensive to build. In other embodiments, the two rearmost support structures are the same height as the other support structures and may be connected with a top brace. Top braces are shown in and discussed with respect to FIG. 5.

Figure 5:
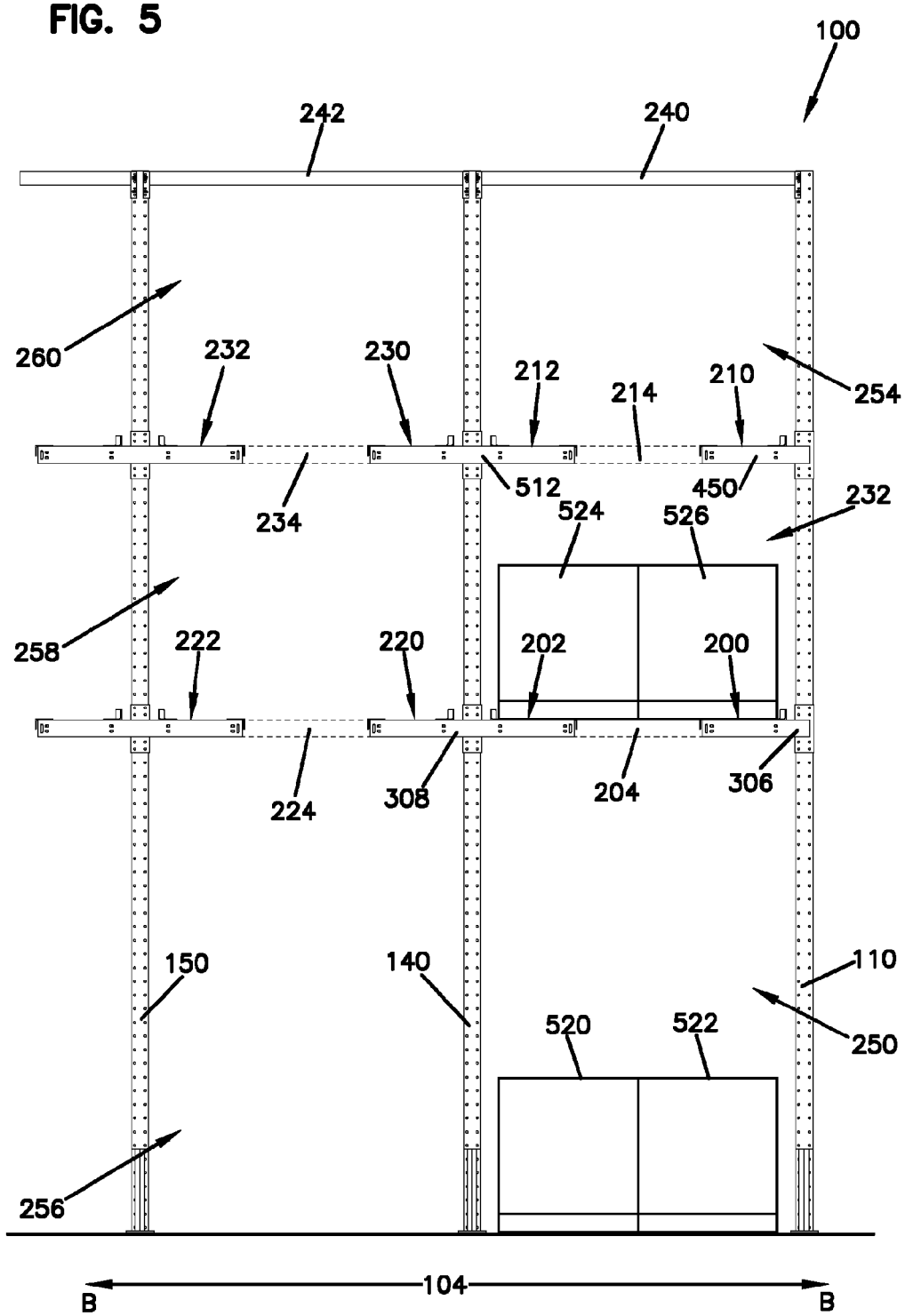
FIG. 5 is a front view of the double-wide drive-in storage rack assembly of FIG. 1.

Referring now to FIG. 5, a front view of storage rack 100 is shown. Top brace 240 is secured to the top of support structures 110 and 140. Top brace 242 is secured to support structures 140 and 150. Similarly, storage rack 100 includes top braces connecting many of the support structures to the corresponding post in the adjacent support assembly. The top braces increase the rigidity of the support structures.

Example palletized loads 520, 522, 524, and 526, which are not part of storage rack 100, are shown to illustrate a function of storage rack 100. Palletized loads 520 and 522 are placed side-by-side in storage location 250 and rest on the floor below storage rack 100. Palletized loads 524 and 526 are placed side-by-side in storage location 252. A portion of palletized load 524 rests on truss beam 202, while the remainder is not supported from below. Similarly, a portion of palletized load 526 rests on truss beam 200, while the remainder is not supported from below. Palletized loads 524 and 526 lean against each other to prevent either of the palletized loads from falling through the gap in between truss beams 200 and 202. As long as the storage rack is rigid and the horizontal surfaces are positioned correctly for the width of the pallets, palletized loads 524 and 526 will not fall through the gap.

Figure 6:
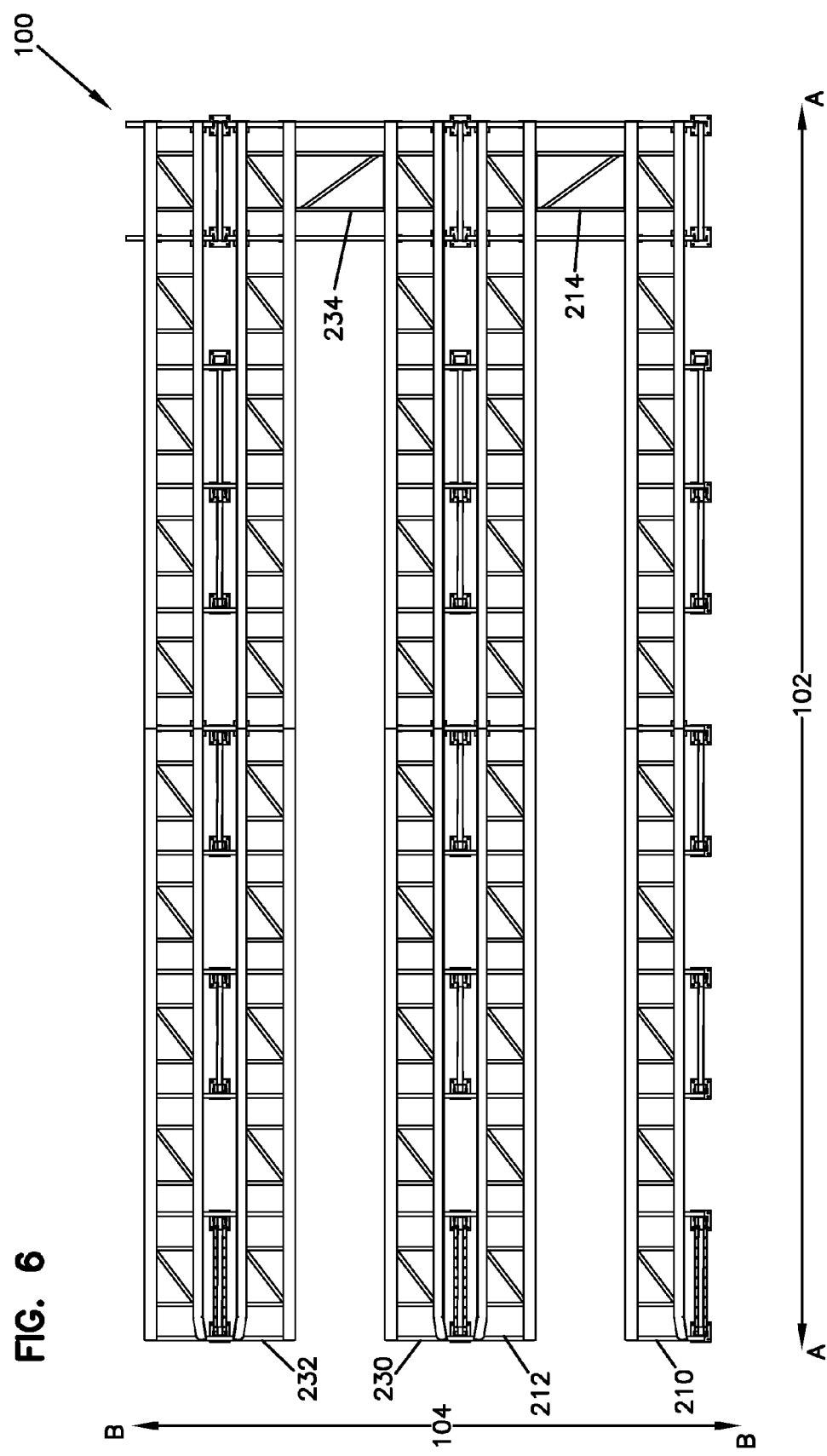
FIG. 6 is top view of the double-wide drive-in storage rack assembly of FIG. 1.

Referring now to FIG. 6, a top view of storage rack 100 is shown in cross section at the location indicated by the line on FIG. 4. Truss beams 210, 212, 230, and 232 run in the down-lane direction from the front to the rear of storage rack 100. Stiffener panels 214 and 234 are adjacent to the rear of the storage rack. Stiffener panel 214 is secured to truss beam 210 and 212. Similarly, stiffener panel 234 is secured to truss beams 230 and 232. The stiffener panel provides greater rigidity to the truss beams. The combination of the stiffener panel and truss beams creates a rigid structure for the entire storage rack.

Figure 7:
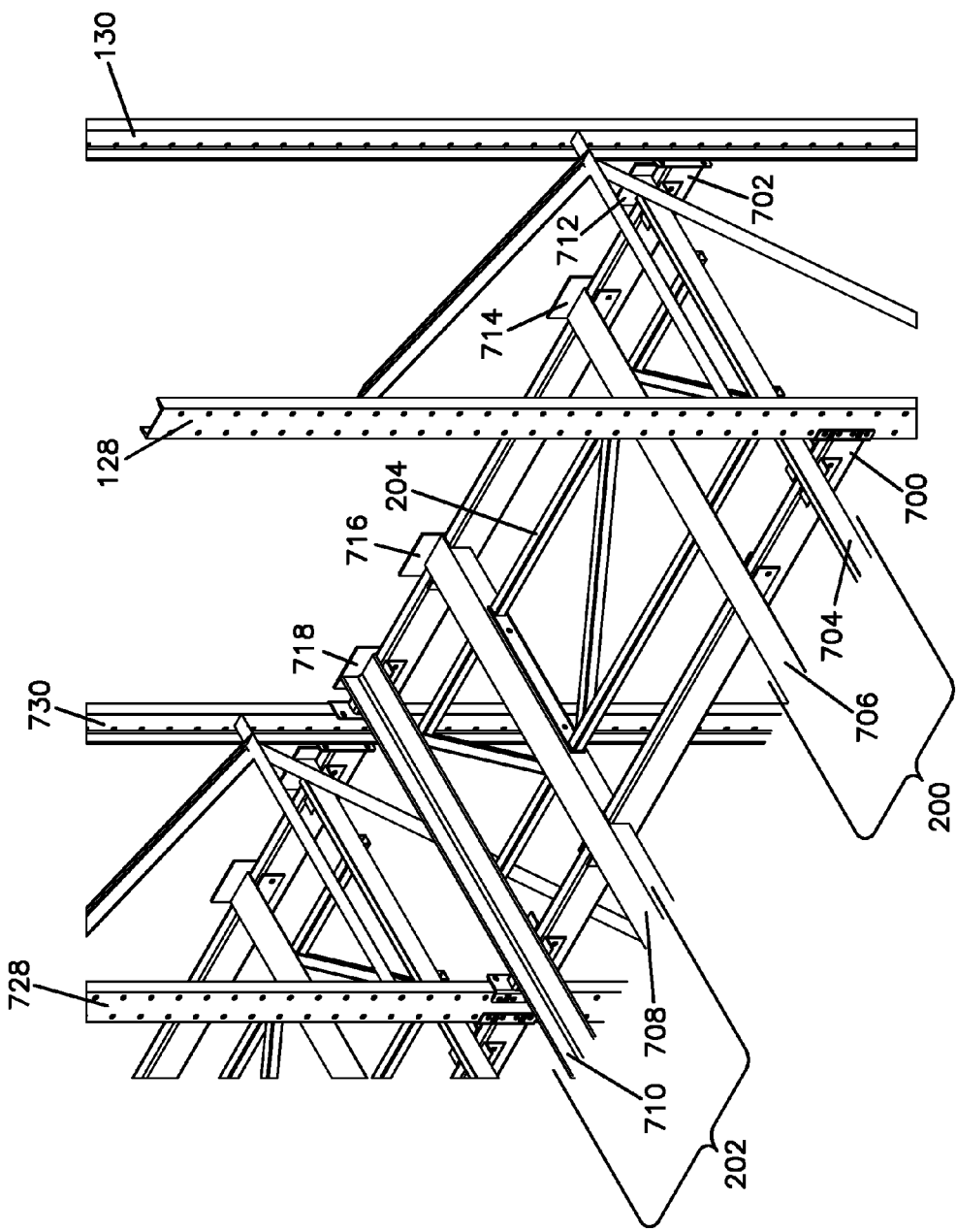
FIG. 7 is a perspective view of an interior tie beam and stiffener panel of the double-wide drive-in storage rack assembly of FIG. 1.

Referring now to FIG. 7, a perspective view of the rear portion of a lane of storage rack 100 is shown. Internal tie beams 700 and 702 connect support structure 128 to support structure 728 and support structure 130 to support structure 730, respectively. The internal tie beams may be secured to the support structures by any means, such as by using a fastener or by welding.

Outer rail 704 and inner rail 706 of truss beam 200 are connected to and supported by internal tie beams 700 and 702. Similarly, outer rail 710 and inner rail 708 of truss beam 202 are also connected to and supported by internal tie beams 700 and 702. The internal tie beams may be secured to the rails of the truss beams by any means, such as by using a fastener or by welding. The internal ties beams provide additional rigidity for the truss beams.

Stiffener panel 204 is secured to inner rail 706 and inner rail 708. The stiffener panel may be secured to the rails of the truss beams by any means, such as by using a fastener or by welding. The stiffener panel provides additional rigidity to the truss beams.

The rear ends of rails 704, 706, 708, and 710 include stoppers 712, 714, 716, and 718, respectively. The stoppers prevent palletized loads that are loaded on the truss beam from sliding off the back of storage rack 100.

Figure 8:
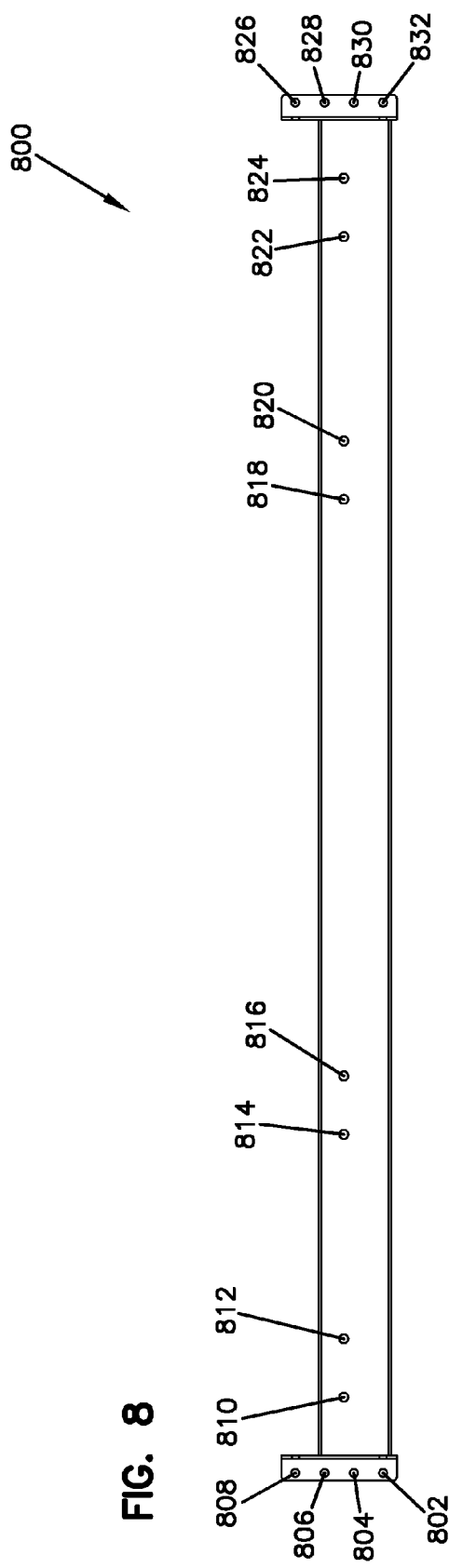
FIG. 8 is an example interior tie beam of the double-wide drive-in storage rack assembly of FIG. 1.

Referring now to FIG. 8, an example internal tie beam 800 is shown. Tie beam 800 is configured to be secured to a first support structure with bolt holes 802, 804, 806, and 808. Similarly, tie beam 800 is configured to be secured to a second support structure with bolt holes 826, 828, 830, and 832. Tie beam 800 is configured to be secured to the outer rail of a first truss beam with bolt holes 810 and 812 and the inner rail of a first truss beam with bolt holes 814 and 816. Similarly, tie beam 800 is configured to be secured to the outer rail of a second truss beam with bolt holes 822 and 824 and the inner rail of a second truss beam with bolt holes 818 and 820. Although the embodiment of internal tie beam 800 shown in FIG. 8 is configured to be secured with bolts, other embodiments of internal tie beam 800 are configured to be secured using other methods, such as by using a fastener or by welding.

Figure 9:
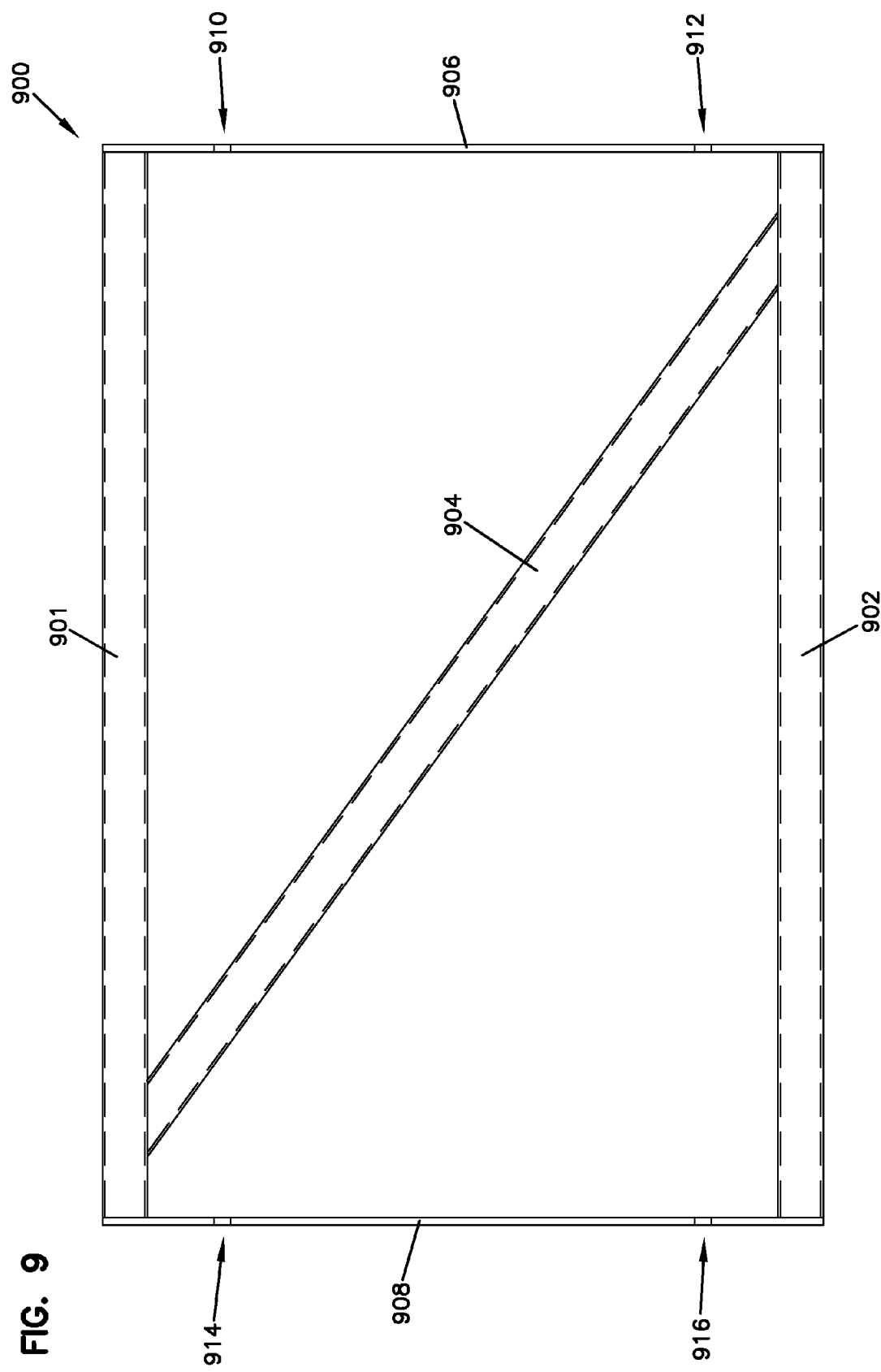
FIG. 9 is an example stiffener panel of the double-wide drive-in storage rack assembly of FIG. 1.

Referring now to FIG. 9, a top view of an example stiffener panel 900 is shown. The panel includes horizontal braces 901 and 902, diagonal brace 904, and end plates 906 and 908. The horizontal braces 901 and 902 are secured to the end plates 906 and 908. Diagonal brace 904 is disposed diagonally between and is secured to horizontal braces 901 and 902. End plate 906 is configured to abut flat against the inner rail of a first truss beam and be secured thereto with bolt holes 910 and 912. End plate 908 is configured to abut flat against the inner rail of a second truss beam and be secured thereto with bolt holes 914 and 916. Although the embodiment of example stiffener panel 900 shown in FIG. 9 is configured to be secured with bolts, other embodiments of stiffener panel 900 are configured to be secured using other methods, such as by using a fastener or by welding.

Figure 10:
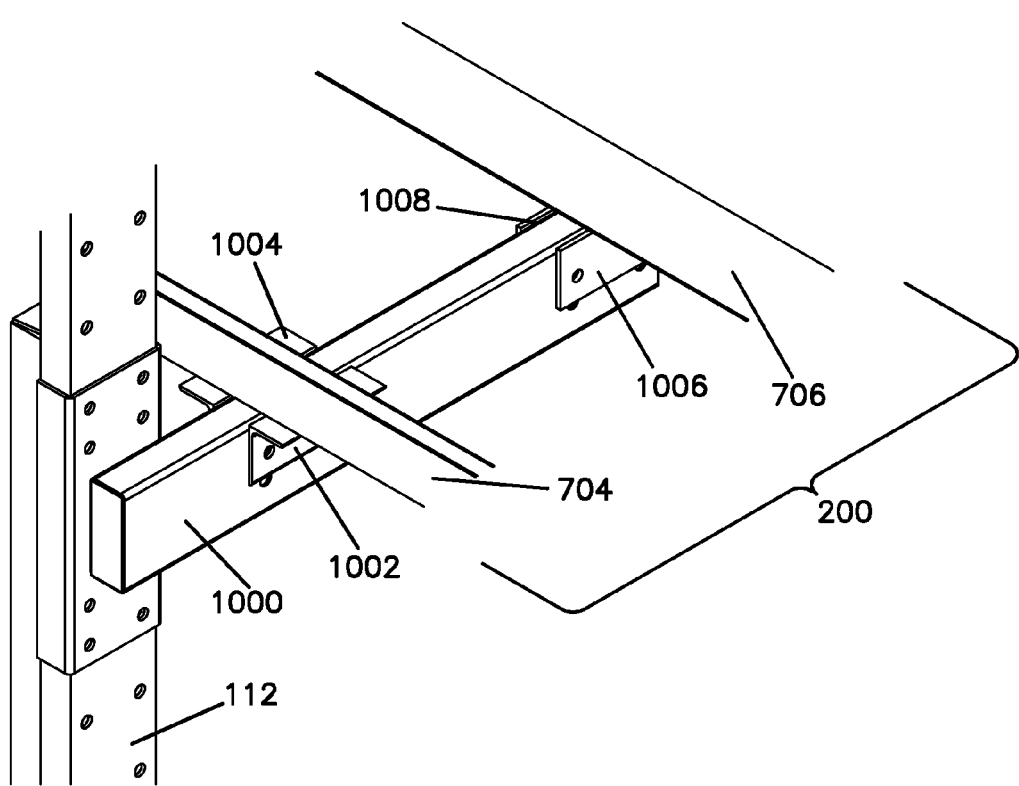
FIG. 10 is a perspective view of the connection between a truss beam and a support arm of the double-wide drive-in storage rack assembly of FIG. 1.

Referring now to FIG. 10, a perspective view of a support arm and a truss beam is shown. Single-sided support arm 1000 is secured to support structure 112. Outer rail 704 of truss beam 200 is secured to support arm 1000 with angled brackets 1002 and 1004. Similarly, inner rail 706 of truss beam 200 is secured to support arm 1000 with angled brackets 1006 and 1008. Although the embodiment of support arm 1000 shown in FIG. 10 is configured to be secured to the support structures and truss beams with angled brackets and bolts, other embodiments of support arm 1000 are configured to be secured using other methods, such as by using a fastener or by welding.

Although, the outer rail 704 and inner rail 706 of truss beam 200 are shown as a single continuous rail, other embodiments are possible. In an alternate embodiment, outer rail 704 and inner rail 706 are each formed from two individual rails that abut each other at support arm 1000. Still other embodiments of outer rail 704 and inner rail 706 are possible.

Figure 11:
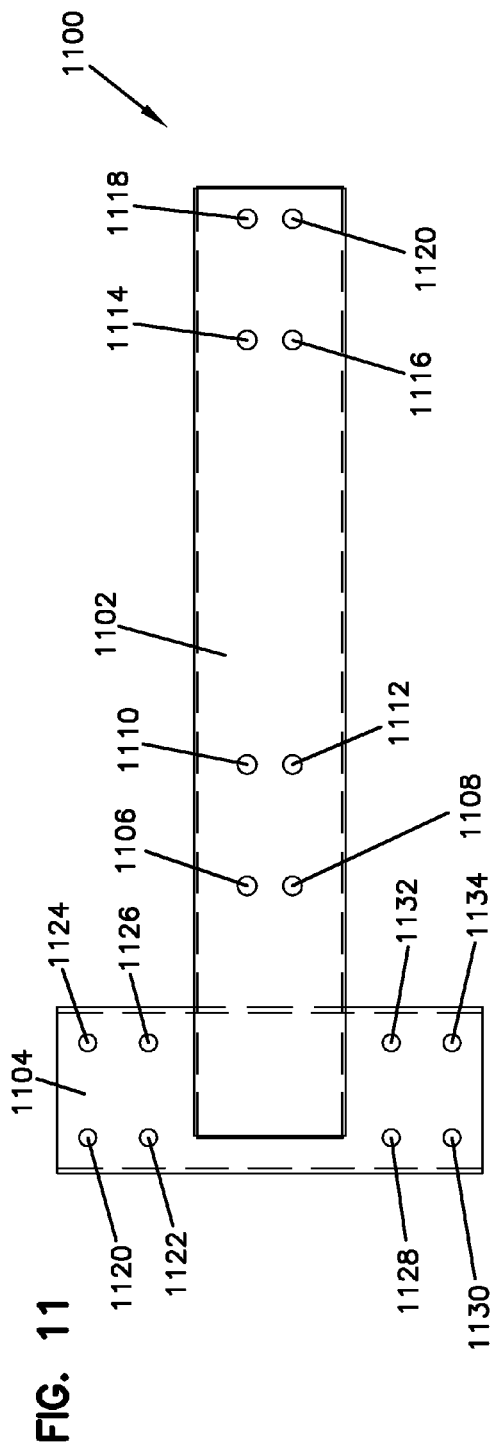
FIG. 11 is a front view of an example single-sided support arm of the double-wide drive-in storage rack assembly of FIG. 1.
Figure 12:
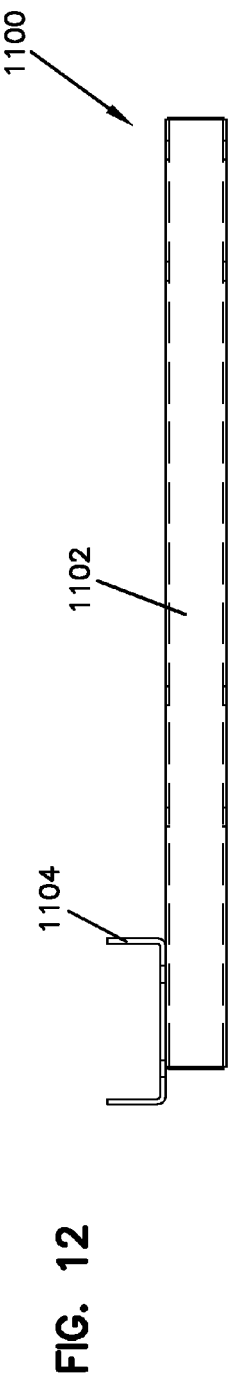
FIG. 12 is a top view of the single-sided support arm of FIG. 11.

Referring now to FIGS. 11 and 12, an example single-sided support arm 1100 is shown. FIG. 11 shows a front view of support arm 1100. FIG. 12 shows a top view of support arm 1100. Support arm 1100 includes a horizontally disposed arm 1102 and vertically disposed bracket 1104. Bracket 1104 includes holes 1120, 1122, 1124, 1126, 1128, 1130, 1132, and 1134 for securing the bracket to a support structure. Arm 1102 includes holes 1106, 1108, 1110 and 1112 for securing, using an angled bracket, support arm 1100 to the outer rail of a truss beam. Similarly, arm 1102 also includes holes 1114, 1116, 1118 and 1120 for securing, using an angled bracket, support arm 1100 to the inner rail of a truss beam. In some embodiments, support arm 1100 is secured to support structures adjacent to the exterior of the storage rack.

Referring now to FIGS. 13 and 14, an example double-sided support arm 1300 is shown. FIG. 13 shows a front view of support arm 1300. FIG. 14 shows a top view of support arm 1300. Support arm 1300 includes a horizontally disposed arm 1302 and vertically disposed bracket 1304. Bracket 1304 includes holes 1320, 1322, 1324, 1326, 1328, 1330, 1332, and 1334 for securing support arm 1300 to a support structure. Arm 1302 includes holes 1306 and 1308 for securing, using an angled bracket, support arm 1300 to the inner rail of a first truss beam. Arm 1302 also includes holes 1310 and 1312 for securing, using an angled bracket, support arm 1300 to the outer rail of a first truss beam. Similarly, arm 1302 includes holes 1318 and 1320 for securing, using an angled bracket, support arm 1300 to the inner rail of a second truss beam. Arm 1302 also includes holes 1314 and 1316 for securing, using an angled bracket, support arm 1300 to the outer rail of a second truss beam. In some embodiments, double-sided support arm 1300 is secured to support structures in the interior of the storage rack.

Figure 15:
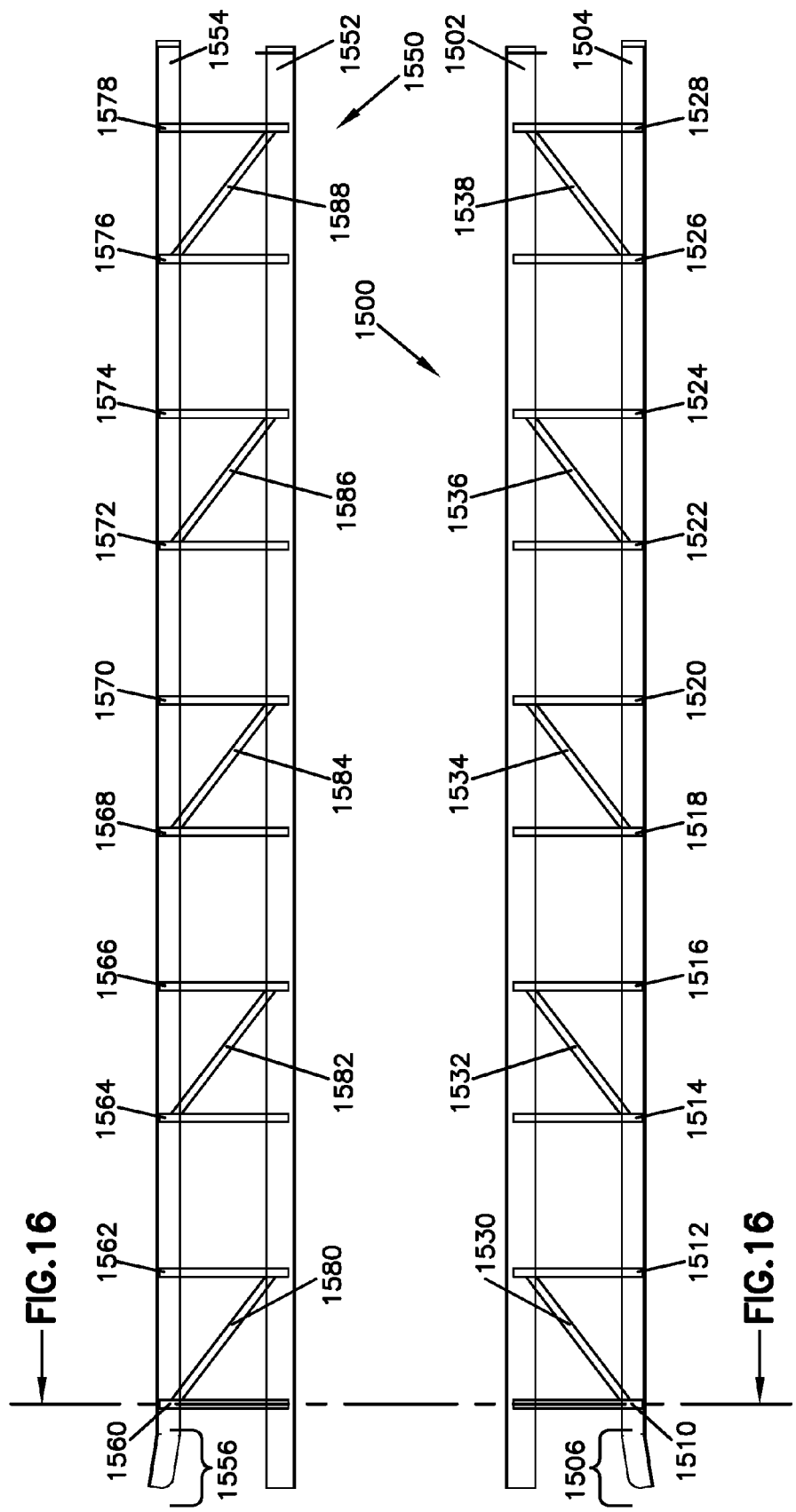
FIG. 15 is a bottom view of an example load-supporting level of the double-wide drive-in storage rack assembly of FIG. 1.
Figure 16:
FIG. 16 is a front, cross-sectional view of the load-supporting level of FIG. 15.

Referring now to FIGS. 15 and 16, an example of first truss beam 1500 and second truss beam 1550 of a load-supporting level is shown. FIG. 15 shows a bottom view of first truss beam 1500 and second truss beam 1550. FIG. 16 shows a front view of first truss beam 1500 and second truss beam 1550 in cross-section at the line indicated on FIG. 15.

First truss beam 1500 includes an inner rail 1502 and an outer rail 1504. Outer rail 1504 is parallel to inner rail 1502. Outer rail 1504 is secured to inner rail 1502 by straight braces 1510, 1512, 1514, 1516, 1518, 1520, 1522, 1524, 1526, and 1528. Outer rail 1504 is also secured to inner rail 1502 by diagonal braces 1530, 1532, 1534, 1536, and 1538. Similarly, second truss beam 1550 includes an inner rail 1552 and an outer rail 1554. Outer rail 1554 is secured to inner rail 1552 by straight braces 1560, 1562, 1564, 1566, 1568, 1570, 1572, 1574, 1576, and 1578. Outer rail 1554 is also secured to inner rail 1552 by diagonal braces 1580, 1582, 1584, 1586, and 1588. In some embodiments, inner rail 1502 and outer rail 1504 are separated by a distance of two feet. In other embodiments, inner rail 1502 and outer rail 1504 are separated by a distance of between one foot and four feet. Yet other embodiments with a smaller or greater separation between inner rail 1502 and outer rail 1504 are possible as well.

Although the embodiments of first truss beam 1500 and second truss beam 1550 shown in FIGS. 15 and 16 each includes ten straight braces and five diagonal braces, other embodiments of first truss beam 1500 and second truss beam 1550 include more or fewer straight braces and more or fewer diagonal braces in similar or alternative orientations.

Outer rail 1504 of first truss beam 1500 and outer rail 1554 of second truss beam 1550 are formed in an L shape with the arm disposed upwards. Inner rail 1502 of first truss beam 1500 and inner rail 1552 of second truss beam 1550 are also formed in an L shape but with the arm disposed downwards.

Additionally, in some embodiments, outer rails 1504 and 1554 include flared portions 1506 and 1556. Flared portions 1506 and 1556 are angled away from inner rails 1502 and 1552, respectively, creating a wider opening for entering the lane with a palletized load. Flared portions 1506 and 1556 are adjacent to the front of the storage rack.

Figure 17:
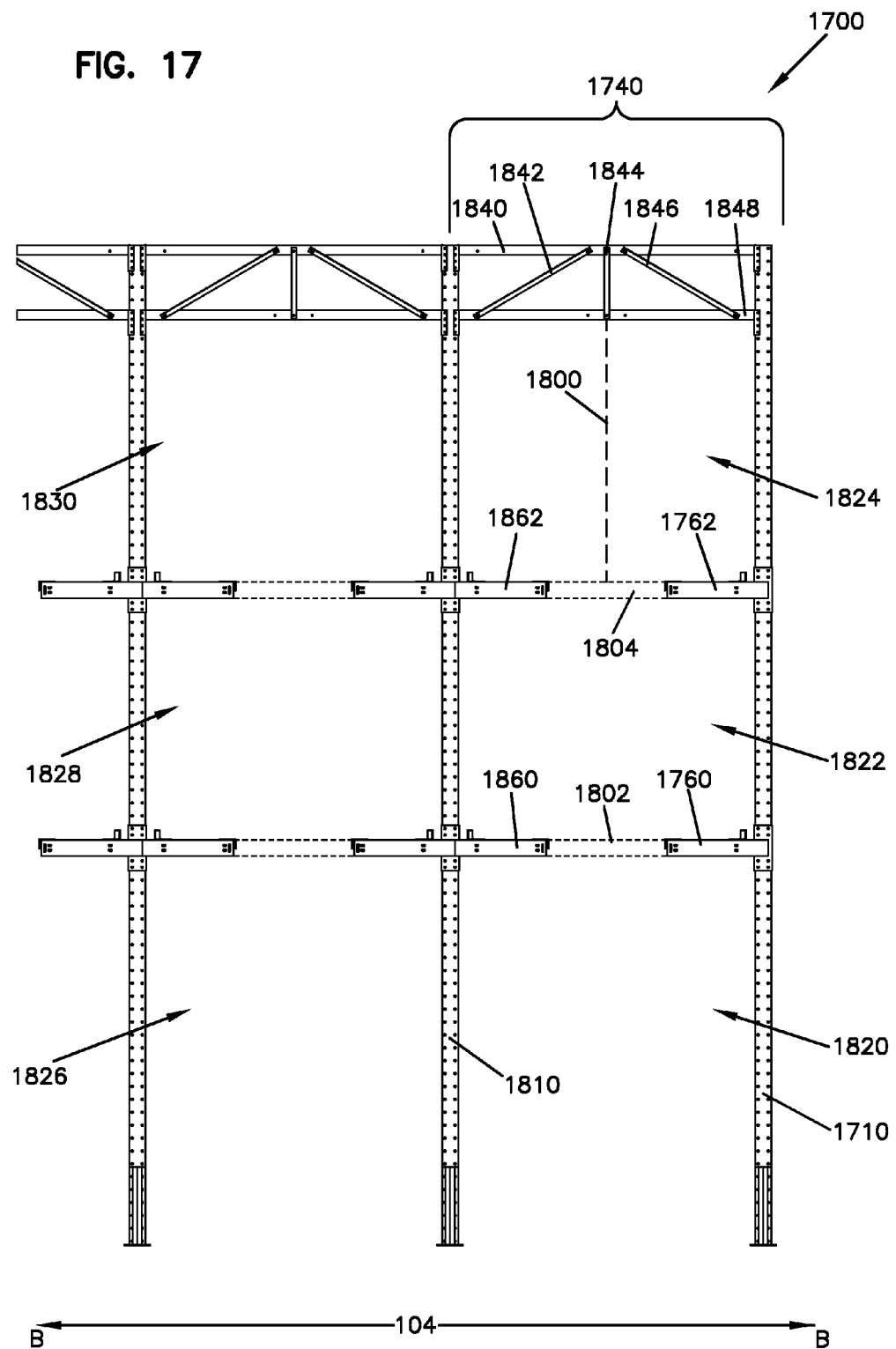
FIG. 17 is a front view of another example double-wide drive-in storage rack assembly.

Referring now to FIG. 17, a front view of an alternate embodiment of a double-wide drive-in storage rack assembly 1700, which includes "mill-building" bracing or trusses, is shown. Storage rack assembly 1700 is similar to storage rack 100 (shown in FIGS. 1-8). Storage rack assembly 1700 includes a plurality of support structures arranged in a plurality of support assemblies that are oriented in the down-lane direction. The support assemblies are separated from each other by a distance that is greater than twice the width of a pallet, forming lanes that can accommodate two side-by-side palletized loads. The lanes are divided vertically into storage locations 1820, 1822, 1824, 1826, 1828, and 1830. For example, the first lane is divided into storage location 1820, 1822, and 1824. Storage location 1822 is formed above storage location 1820 and is separated from storage location 1820 by a first load-supporting level, defined by truss beams 1760 and 1860 and stiffener panel 1802. Similarly, storage location 1824 is formed above storage location 1822 and is separated from storage location 1822 by a second load-supporting level, defined by truss beams 1762 and 1862 and stiffener panel 1804.

One additional element of storage rack assembly 1700 is mill-building bracing. The mill-building bracing is disposed in the cross-lane direction 104 to connect a support structure from one support assembly to the corresponding support structures in an adjacent support assembly. The mill-building braces provide greater rigidity to the adjacent support structures. For example, mill-building brace 1740 connects support structure 1710 to support structure 1810. The bottom of brace 1740 forms the top of storage location 1824. Brace 1740 is positioned above truss beams 1762 and 1862 by a distance 1800. Distance 1800 is a distance that is large enough to accommodate the height of a palletized load plus a lift-off height. The lift-off height is a buffer that allows the palletized load to be lifted above truss beams 1762 and 1862 so that the palletized load can be moved without dragging on truss beams 1762 and 1862. In some embodiments, the lift-off height is between four and six inches. The components of brace 1740 are described in more detail in FIG. 18.

Figure 18:
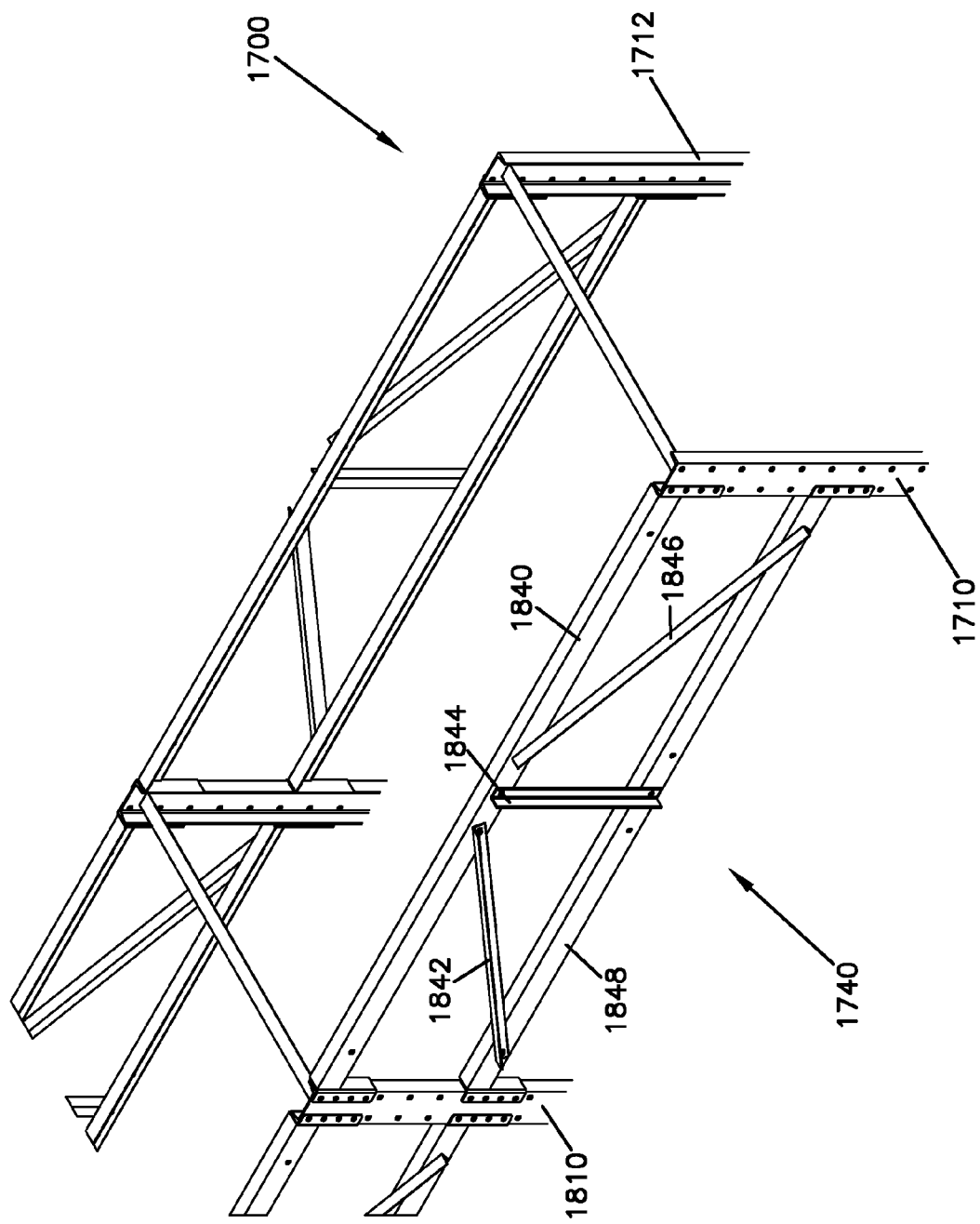
FIG. 18 is perspective view of the mill-building bracing of the double-wide drive-in storage rack assembly of FIG. 17.

Referring now to FIG. 18, a perspective view of storage rack assembly 1700 is shown, which focuses on mill-building brace 1740. Brace 1740 includes horizontal tie beams 1840 and 1848, which are both secured on a first end to support structure 1710 and on a second end to support structure 1810. Brace 1740 also includes support brace 1844, which is secured to and disposed vertically between tie beams 1840 and 1848. Similarly, support braces 1842 and 1846 are secured to and disposed diagonally between tie beams 1840 and 1848. In other embodiments, fewer or more braces are disposed diagonally or vertically.

Figure 19:
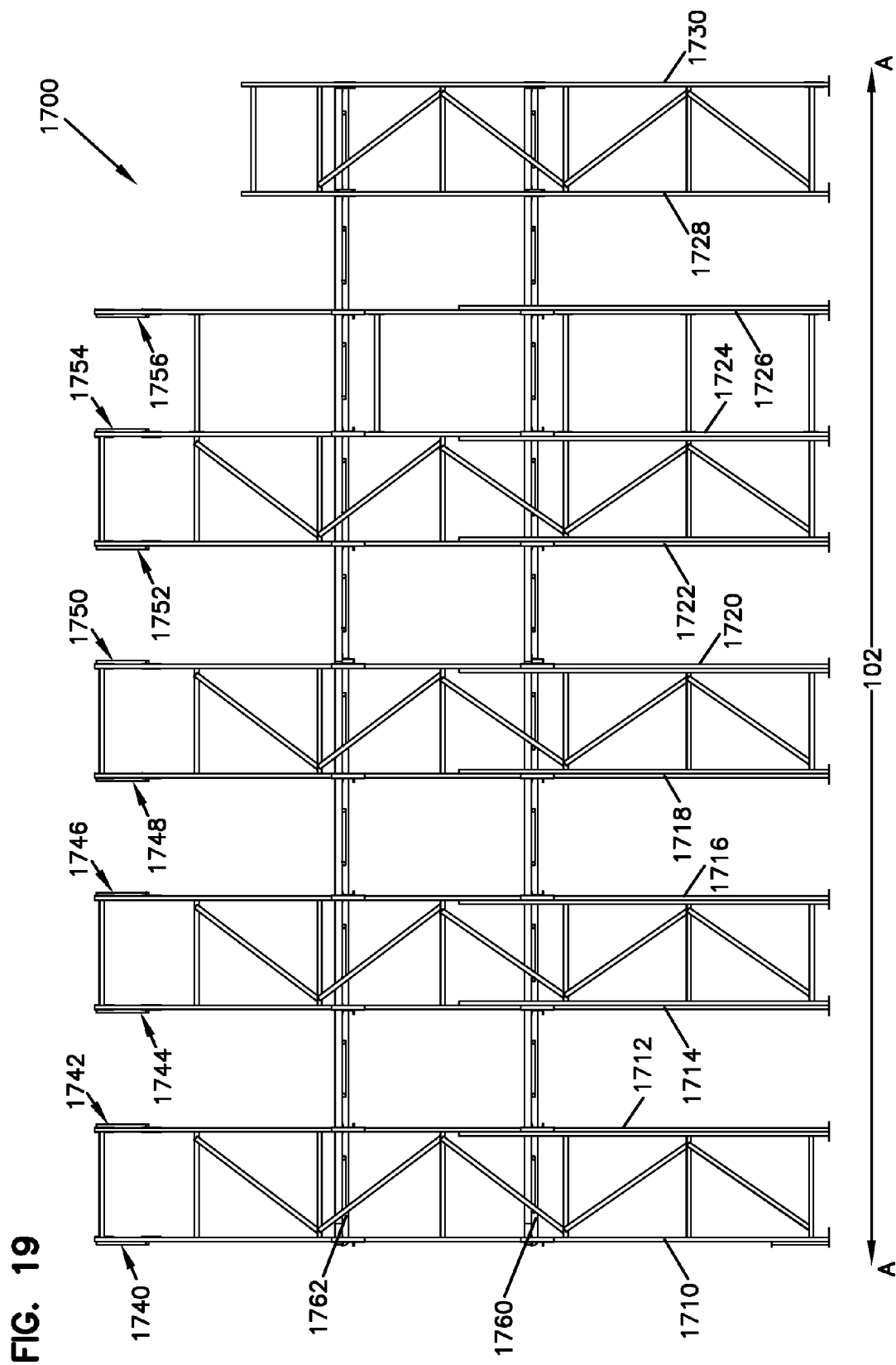
FIG. 19 is a side view of the double-wide drive-in storage rack assembly of FIG. 17.

Referring now to FIG. 19, a side view of storage rack assembly 1700 is shown. Mill-building braces 1740, 1742, 1744, 1746, 1748, 1750, 1752, 1754, and 1756 are disposed in the cross-lane direction from support structures 1710, 1712, 1714, 1716, 1718, 1720, 1724, and 1726 of a first support assembly to connect to the corresponding support structures of a second support assembly.

In some embodiments, the two rearmost support structures in each support assembly are not connected with mill-building braces. For example, support structures 1728 and 1730 are not secured to a mill-building brace. Due to support structures 1728 and 1730 proximity to the stiffener panels in the rear of the storage racks, support structures 1728 and 1730 may not need the additional stiffness provided by a mill-building brace. In other embodiments, the two rearmost support structures may be connected with a mill-building brace.

All of the components of the illustrated embodiments may be formed from steel or any other similar rigid material.

The above disclosure is directed to a double-wide drive-in storage rack constructed with dual-rail truss-beams to increase rigidity and minimize the amount of steel used in the storage rack. However, the storage rack is not limited to applications involving double-wide drive-in storage racks. In general, the disclosed storage rack can be used in applications of any width.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A storage rack, arranged in lanes for supporting loads on pallets, the storage rack comprising:
   a first plurality of support structures spaced apart in a down-lane direction and extending laterally between a rear end of the rack and a front end of the rack, the support structures being positioned along a first side of the rack;
   a second plurality of support structures spaced apart in the down-lane direction and extending laterally between the rear end of the rack and the front end of the rack, the second plurality of support structures being positioned laterally in a cross lane direction from the first plurality of support structures along a second side of the rack;
   a plurality of support arms on each of the support structures, the support arms being spaced apart vertically on columns to extend horizontally out from the columns in the cross-lane direction at a plurality of load-supporting levels, the support arms on each column being located in horizontal alignment with support arms on adjacent columns down-lane and cross-lane to provide load support at the levels, the support arms being secured to the columns;
   a plurality of pairs of truss beams extending laterally in the down-lane direction between the rear end of the rack and the front end of the rack at each load-supporting level, each of the truss beams comprising a first rail and a second rail, the first rail and the second rail being spaced apart horizontally in the cross-lane direction, each truss beam including a plurality of groups of coplanar, horizontal support braces, wherein each group of coplanar, horizontal support braces includes two perpendicular support braces extending perpendicularly from the first rail to the second rail and a diagonal support brace extending diagonally from the first rail to the second rail, wherein a first end of the diagonal support brace is disposed under at least a portion of the first rail and a second end of the diagonal support brace is disposed under at least a portion of the second rail, each truss beam being secured to one or more of the support arms; and
   a plurality of stiffener truss beams, each stiffener truss beam extending laterally in the cross-lane direction at each load-supporting level, each stiffener truss beam being positioned at the rear end of the rack, each stiffener truss beam comprising a first rail and a second rail, the first rail and the second rail being space apart horizontally in the down-lane direction, each stiffener truss beam including a plurality of horizontal support braces extending perpendicularly from the first rail to the second rail and a plurality of horizontal support braces extending diagonally from the first rail to the second rail; and wherein each pair of truss beam in the plurality of pairs of truss beams is secured to one of the stiffener truss beams.

2. The storage rack of claim 1, wherein each truss beam further comprises a first stopper secured to the rear end of the first rail of the truss beam and a second stopper secured to the rear end of the second rail of the truss beam.

\* \* \* \* \*

UNITED STATES PATENT AND TRADEMARK OFFICE
CERTIFICATE OF CORRECTION

PATENT NO. : 9,545,150 B2  
APPLICATION NO. : 14/052379  
DATED : January 17, 2017  
INVENTOR(S) : Arlin Dennis Keck It is certified that error appears in the above-identified patent and that said Letters Patent is hereby corrected as shown below:

Column 11, Line 3 in Claim 1: "space apart" should read --spaced apart--

Signed and Sealed this
Eighth Day of May, 2018

Andrei Iancu
*Director of the United States Patent and Trademark Office*